United States Patent
Sorqvist et al.

(10) Patent No.: US 9,925,099 B2
(45) Date of Patent: Mar. 27, 2018

(54) WHEELCHAIR GEARSHIFT ARRANGEMENT

(71) Applicant: GEARWHEEL AB, Vasteras (SE)

(72) Inventors: Christofer Sorqvist, Ulricehamn (SE); John-Edvard Stenstrand, Vasteras (SE); Lars Tenerz, Uppsala (SE)

(73) Assignee: GearWheel AB, Jönköping (SE)

( * ) Notice: Subject to any disclaimer, the term of this patent is extended or adjusted under 35 U.S.C. 154(b) by 193 days.

(21) Appl. No.: 14/435,039

(22) PCT Filed: Oct. 11, 2012

(86) PCT No.: PCT/SE2012/051090
§ 371 (c)(1),
(2) Date: Apr. 10, 2015

(87) PCT Pub. No.: WO2014/058365
PCT Pub. Date: Apr. 17, 2014

(65) Prior Publication Data
US 2015/0272794 A1    Oct. 1, 2015

(51) Int. Cl.
*A61G 5/02* (2006.01)
*B60B 35/12* (2006.01)
(Continued)

(52) U.S. Cl.
CPC .............. *A61G 5/10* (2013.01); *A61G 5/023* (2013.01); *A61G 5/101* (2013.01); *A61G 5/1054* (2016.11);
(Continued)

(58) Field of Classification Search
CPC ...... A61G 5/10; A61G 5/1083; A61G 5/1097; A61G 5/023; B60B 35/122; F16H 61/28
(Continued)

(56) References Cited

U.S. PATENT DOCUMENTS 3,563,568 A * 2/1971 Sasse ................. A61G 5/02
                                                    280/230
5,362,081 A   11/1994 Beidler et al.
(Continued)

FOREIGN PATENT DOCUMENTS

EP        1627619        2/2006
WO    WO1994020323 A1    9/1994
(Continued)

OTHER PUBLICATIONS

European Search Report for Application No. 12886353.7, dated Jun. 3, 2016, 5 pages.
(Continued)

*Primary Examiner* — Tony H Winner
(74) *Attorney, Agent, or Firm* — Fish & Richardson P.C.

(57) ABSTRACT

Embodiments herein relate to a wheelchair gearshift arrangement (10), which comprises an axle tube (20) and a pair of wheel attachment adaptors (30) inserted into a respective end (21, 22) of the axle tube (20). The wheel attachment adaptors (30) further includes a respective axle sleeve (40) adapted to receive and hold a respective wheel axle (51) of a respective complete wheelchair wheel (50). Each complete wheelchair wheel (50) having a respective wheel axle centric, axially translatable, gear change mechanism (52). One or more gear change actuators (80) are arranged within the axle tube (20) such that they are operative to selectively, upon user manipulation of an associated gear selector (60), axially translate the associated gear change mechanisms (52) of the respective complete wheelchair wheels (50). Such translation will affect a change of gear ratio between a push-rim (55) and wheel-rim (56) of each respective complete wheelchair wheel (50).

17 Claims, 9 Drawing Sheets

(51) Int. Cl.
*A61G 5/10* (2006.01)
*B60B 35/16* (2006.01)
*F16H 61/28* (2006.01)

(52) U.S. Cl.
CPC .......... *A61G 5/1083* (2016.11); *B60B 35/122* (2013.01); *B60B 35/163* (2013.01); *F16H 61/28* (2013.01); *A61G 5/026* (2013.01); *A61G 2200/20* (2013.01); *F04C 2270/0421* (2013.01); *Y10T 74/20037* (2015.01)

(58) Field of Classification Search
USPC ...................................................... 280/250.1
See application file for complete search history.

(56) References Cited

U.S. PATENT DOCUMENTS

| | | | |
|---|---|---|---|
| 5,482,305 | A | 1/1996 | Jeffries |
| 5,727,850 | A | 3/1998 | Masclet |
| 5,846,154 | A | 12/1998 | Godin |
| 6,182,992 | B1 | 2/2001 | Garven, Jr. |
| 7,832,753 | B2 | 11/2010 | Soerquist |
| 7,837,210 | B2 | 11/2010 | Kylstra et al. |
| 9,060,906 | B2 | 6/2015 | Malm et al. |
| 2001/0011805 | A1* | 8/2001 | Kueschall ................ A61G 5/00 280/250.1 |
| 2002/0187867 | A1 | 12/2002 | Ichida et al. |
| 2004/0104554 | A1 | 6/2004 | Watwood et al. |
| 2006/0049593 | A1* | 3/2006 | Schreiber ............. A61G 5/1097 280/86.751 |
| 2008/0073869 | A1 | 3/2008 | Patterson |
| 2009/0166995 | A1 | 7/2009 | Sorquist |
| 2009/0273156 | A1 | 11/2009 | Byun |
| 2014/0013891 | A1 | 1/2014 | Malm et al. |

FOREIGN PATENT DOCUMENTS

| | | |
|---|---|---|
| WO | WO2004084787 A1 | 10/2004 |
| WO | WO2007145581 A1 | 12/2007 |
| WO | WO2012105879 A1 | 8/2012 |

OTHER PUBLICATIONS

International Search Report and Written Opinion for PCT/SE2012/051090, dated Jun. 20, 2013, 10 pages.
International Preliminary Report on Patentability for PCT/SE2012/051090, dated Apr. 14, 2015, 5 pages.

* cited by examiner

WHEELCHAIR GEARSHIFT ARRANGEMENT

CROSS-REFERENCE TO RELATED APPLICATION

This application is a National Stage Application under 35 U.S.C. § 371 and claims the benefit of International Application No. PCT/SE2012/051090, filed Oct. 11, 2012. The disclosure of the foregoing application is hereby incorporated by reference in its entirety.

TECHNICAL FIELD

Embodiments herein relate to wheelchair gearshift arrangement as well as a wheelchair comprising such a wheelchair gearshift arrangement.

BACKGROUND

It is becoming increasingly more common for wheelchairs wheels to be provided with gears in order to facilitate use thereof for different users, especially when travelling on surfaces having varying gradients. This is especially the case for wheels intended for use on manually powered wheelchairs.

Users' success in operating a manually powered wheelchair and doing so independently depends greatly on their ability to power it themselves. Whereas some individuals with manual wheelchairs have access to staff for pushing the wheelchair, it is usually desirable for users themselves to be able to propel their wheelchairs.

Manual wheelchairs are usually propelled, steered and braked by users, either by turning or gripping a ring attached to each wheel of the wheelchair. Each such gripping ring is structurally connected to the respective wheel of the wheelchair, the latter being in contact with the running surface. Users usually have to exert a relatively large force to effect many of the operations involved in using a conventional wheelchair, by acting upon the gripping rings on either side of the wheelchair.

These operations may cause users various kinds of acute and chronic arm and shoulder damage. Other problems include elbow, wrist and hand damage caused by repetitive stress on these parts of the body. Users' hands may also sustain wear-and-tear damage due to abrasion and friction between hands and gripping rings.

Various environmental factors may accelerate or even cause said damage, e.g. rough ground or uneven surfaces on which the wheelchair travels. Using a wheelchair in rain or on snow or ice or with cold or slippery hands may also cause damage. In many cases, the occurrence of such damage may be a contributory factor in otherwise healthy users being compelled to change to a powered wheelchair or needing assistance to move their wheelchair.

A number of steps have already been taken in the past to improve the performance of manual wheelchairs and make their use less burdensome for users. Such improvements include two-speed wheelchairs of the kind referred to e.g. in U.S. Pat. No. 7,832,753 to the present applicant, and which is hereby included by reference in its entirety. U.S. Pat. No. 7,832,753 relates to a gear shift pertaining to a hub of a wheel with a quick lock. The hub has a gear which is supported round a shaft with an outer end and an inner end. The inner end of the shaft is suspended via a suspension device on a wheelchair. The quick lock includes a rod which runs in a cylindrical hole which is concentric within and with the shaft and a catch which locks the wheel with the shaft to the suspension device. The gear shift includes the shaft, the rod and a control, all of which are so adapted that the rod has a neutral position relative to the shaft and wherein a movement, relative to the shaft, of the rod from the neutral position in a direction from the outer end of the shaft towards the inner end of the shaft disengages the catch so that the wheel together with the shaft can be locked to and released from the suspension device. The rod is further provided with a gear selector contact configured to contact a gear selector in the gear, and, by a movement, relative to the shaft, of the rod in an axial direction from the neutral position in a direction from the inner end of the shaft to the outer end of the shaft, acts via the gear selector contact to cause the gear selector in the gear to change gear position so that the gear ratio of the wheel relative to a drive device for the wheel is changed.

In U.S. Pat. No. 7,832,753 the choice of gear position is controlled by a gear positioner, which is situated within easy reach on the wheelchair frame. The gear positioner transmits the gear positions set by the user via a control, which may take the form of a wire or other elongate flexible means or a link system, to the rod which controls the gear selector in the planetary gear. A wheelchair is usually provided with two wheels driven by gripping rings. Both wheels are, according to U.S. Pat. No. 7,832,753, said to preferably be equipped with the gear change mechanism, in which case it is stated as advantageous that the gear positioner should act on planetary gears in both wheels in order to set the same gear position for both wheels.

The gear shift according to U.S. Pat. No. 7,832,753 thus comprises a control for operating the rod in order to impart a selected gear position. According to one embodiment, the control takes the form of a wire connected to a gear positioner disposed at a location convenient to the user. According to this embodiment a lever is disposed at the end of the control, which acts upon the rod. The lever is provided with an eccentric. In a first gear change position, the eccentric on the lever does not abut against the rod. The spring force of a return spring holds the gear stationary in the first gear change position. Switching of the gear positioner, for selection of a second gear position, will cause consequent pulling of the wire, the lever pivots, with the result that the eccentric pushes the rod in and thereby causes the rod, the shaft spigot and the gear selector to set a second gear position in the gear.

Where a gear shift according to U.S. Pat. No. 7,832,753 is used on a wheelchair, it is advantageous that both of the wheelchair's wheels be subjected to approximately simultaneous gear changing and that the same gear ratio be set for both wheels.

However, although it has been found that such a wire operated gear change system works quite well a few drawbacks have been identified. Firstly, the wheel attachment adaptors used will be sensitive to external or environmental influences, such as shocks, moisture and soiling, such as from dirt, gravel, snow, ice and slush, which may cause malfunctions. Secondly, although a requirement that the wheelchair's wheels needs to be aligned is usually are met quite well immediately after initial application of the wheel attachment adaptors, the wheel adaptors are prone to become un-aligned after a period of time. This will in turn cause the wheels of the wheelchair to become un-aligned having unsuitable camber and/or toe-in, toe-out angles, having a negative impact on the usability of the wheelchair. This as the angle of the wheels to the direction of travel, the so called or toe-in and toe-out angles affect the stability of the wheelchair in the direction of travel, and furthermore, the angle to the surface travelled upon, the so called camber angle affects the ability of the wheelchair to negotiate corners, i.e. the cornering ability thereof.

SUMMARY

Embodiments herein aim to provide an improved wheelchair gearshift arrangement useable in conjunction with wheelchair wheels of the kind described in U.S. Pat. No. 7,832,753 or similar, which addresses one or more of the above drawbacks.

This is provided through a wheelchair gearshift arrangement which comprises an axle tube and a pair of wheel attachment adaptors inserted into a respective end of the axle tube and including a respective axle sleeve adapted to receive and hold a respective wheel axle of a respective complete wheelchair wheel having a respective wheel axle centric, axially translatable, gear change mechanism, such that one or more gear change actuators arranged within the axle tube are operative to selectively, upon user manipulation of an associated gear selector, axially translate the associated gear change mechanisms of the respective complete wheelchair wheels to affect a change of gear ratio between a push-rim and wheel-rim of each respective complete wheelchair wheel.

The provision of an axle tube inside of which the further components of the gearshift arrangement are arranged provides for an easily attachable unit, which may be attached to newly designed wheelchairs as well as retrofitted to existing wheelchairs, in order to provide these wheelchairs with the ability for a user to select a change of gear ratio between the push-rims and wheel-rims of a wheelchair used and thus promote mobility for the user. Such a unit can be produced to add a limited amount of weight to a wheelchair, as the axle tube usually may be attached to the wheelchair using standard axle tube attachment means. Furthermore, the axle tube provides protection for the further components of the gearshift arrangement, protecting these against external or environmental influences, such as shocks, moisture and soiling, such as from dirt, gravel, snow, ice and slush, and similar, whereby a well-functioning and reliable wheelchair gearshift arrangement is provided, which of course is imperative for disabled users. Still further, the axle tube provides for alignment between the left-hand-side and the right-hand side wheel attachment adaptors, promoting consistent camber and/or toe-in, toe-out angles, which ensures for the user a controllable, comfortable and easy to handle and maneuver wheelchair.

According to a second aspect the axle sleeve of each respective wheel attachment adaptor comprises means for preventing rotation of a wheel axle held therein relative to the axle tube.

Means for preventing rotation of the wheel axle are necessary as the wheel axle of a geared wheelchair wheel as described herein must be held such that it is prevented from rotating in order to provide a fix-point for the planetary gears of the wheelchair wheel, without which fix-point it would not be possible to affect a change of gears.

According to a third aspect the means for preventing rotation of a wheel axle held therein comprises an element, which is rotation inhibited with respect to the axle tube, and has a non-circular axle sleeve section adapted to receive a complementary non-circular distal section of a wheel axle for inhibiting rotation thereof relative to the axle tube.

The provision of non-circular axle sleeve section adapted to receive a complementary non-circular distal section of a wheel axle provides for simple and reliable means for preventing rotation of a wheel axle held therein relative to the axle tube, which may be produced at low cost and provide for reliable and durable operation.

According to a fourth aspect the rotation inhibited element is arranged to, upon insertion of a wheel axle into the axle sleeve, be displaced inside the axle tube against a returning spring from a first wheel axle rotation inhibiting position to a second position outside the distal section of an inserted wheel axle where the complementary non-circular distal section of the wheel axle is free to rotate relative to the axle tube until the complementary non-circular distal section of a wheel axle matches the non-circular axle sleeve section whereupon the rotation inhibited element is arranged to be returned to the first wheel axle rotation inhibiting position by the returning spring for inhibiting rotation of the wheel axle relative to the axle tube.

The provision of a rotation inhibited element which is displaced upon insertion and returned upon matching provides for automatic provision of wheel axle rotation prevention upon insertion of a wheel axle into the axle sleeve, whereby correct functioning of the wheelchair gearshift arrangement will be ensured automatically upon attaching a set of wheels to the wheelchair.

According to a fifth aspect the rotation inhibited element is displaceable along one or more guide elements which are connected to a circular axle sleeve element of the wheel attachment adaptors which is fixed to the axle tube.

The provision of guide elements ensures that the rotation inhibited element is displaceable whilst ensuring that the rotation inhibited element is prevented from rotating relative to the axle tube, thus ensuring the functionality of the planetary gearing of an attached wheelchair wheel.

According to a sixth aspect the axle sleeve comprises a recess formed inside the axle sleeve for receiving a quick locking catch arranged at the wheel axle of the complete wheelchair wheel for inhibiting axial displacement of the wheel axle relative to the axle sleeve, and where release of the quick locking catch may be effected through axial displacement of the axially translatable, gear change mechanism in a direction inwards of the axle sleeve.

The provision of a recess formed inside the axle sleeve provides for a simple, easy to manufacture, robust and reliable receptor for the quick locking catch of the complete wheelchair wheel.

According to a seventh aspect a central axis of each respective axle sleeve is inclined relative to a central axis of the axle tube, such that any complete wheelchair wheels being attached thereto are automatically provided with appropriate camber and/or toe-in, toe-out angles when the axle tube is attached to the chassis of a wheelchair.

The provision of axle sleeve inclination relative to a central axis of the axle tube allows for optimization of camber and/or toe-in, toe-out angles, which ensures for the user a controllable, comfortable and easy to handle and maneuver wheelchair. It further contributes to impeding rotation of the different parts of the wheel attachment adaptors, e.g. a circular axle sleeve section and a non-circular axle sleeve section and an actuator attachment axle sleeve element.

According to an eight aspect the axle tube is bent such that the central axis's of the respective axle sleeves are inclined relative to each other, such that any complete wheelchair wheels being attached thereto are automatically provided with appropriate camber and/or toe-in, toe-out angles when the axle tube is attached to the chassis of a wheelchair.

The provision of a bent axle tube provides for an alternative way of allowing for optimization of camber and/or toe-in, toe-out angles, in order to ensures for the user a controllable, comfortable and easy to handle and maneuver wheelchair.

According to a ninth aspect one gear change actuator is arranged within the axle tube such that it is operative to selectively, upon user manipulation of the associated gear selector, simultaneously axially translate both of the associated gear change mechanisms to affect the change of gear ratio.

The provision of one common gear change actuator for both the left-hand-side and the right-hand-side gear change mechanisms provides for a cost effective and completely synchronous gearshift arrangement.

According to a tenth aspect a respective gear change actuator is arranged within the axle tube adjacent each respective wheel attachment adaptor such that they are operative to selectively, upon user manipulation of the associated gear selector, simultaneously axially translate both of the associated gear change mechanisms to affect the change of gear ratio.

The provision of a respective gear change actuator for the left-hand-side and the right-hand-side gear change mechanisms provides for the ability to provide fully assembled wheel attachment adaptor/gear change actuator units for insertion into the respective ends of the axle tube, thus facilitating initial assembly as well as maintenance and repair of the wheelchair gearshift arrangement.

According to an eleventh aspect the one or more gear change actuators comprises a spring returned hydraulic cylinder piston arrangement.

The provision of a spring returned hydraulic cylinder piston provides for a reliable gear change actuator suitable to provide for a high level of force multiplication for a disabled user manipulating an associated gear selector.

According to a twelfth aspect the one or more gear change actuators comprises an electrical actuator.

The provision of an electrical actuator provides for an alternative reliable gear change actuator suitable to provide for a high level of force multiplication for a disabled user manipulating an associated gear selector.

According to a thirteenth aspect the one or more gear change actuators comprises a pneumatic actuator.

The provision of a pneumatic actuator provides for yet an alternative reliable gear change actuator suitable to provide for a high level of force multiplication for a disabled user manipulating an associated gear selector.

According to a fourteenth aspect the one or more gear change actuators comprises one or more mechanical actuators which are arranged to transfer gear change movement from the associated gear selector via a mechanical transfer mechanism, such as a linkage or a wire arrangement.

The provision of mechanical actuators provides for low cost, simple and easily serviceable actuators facilitating service and repair in the field, i.e. allowing service and repair using improvised replacement parts, which may be an advantage for user operating their wheelchair in remote areas.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DESCRIPTION OF EMBODIMENTS

Figure 1:
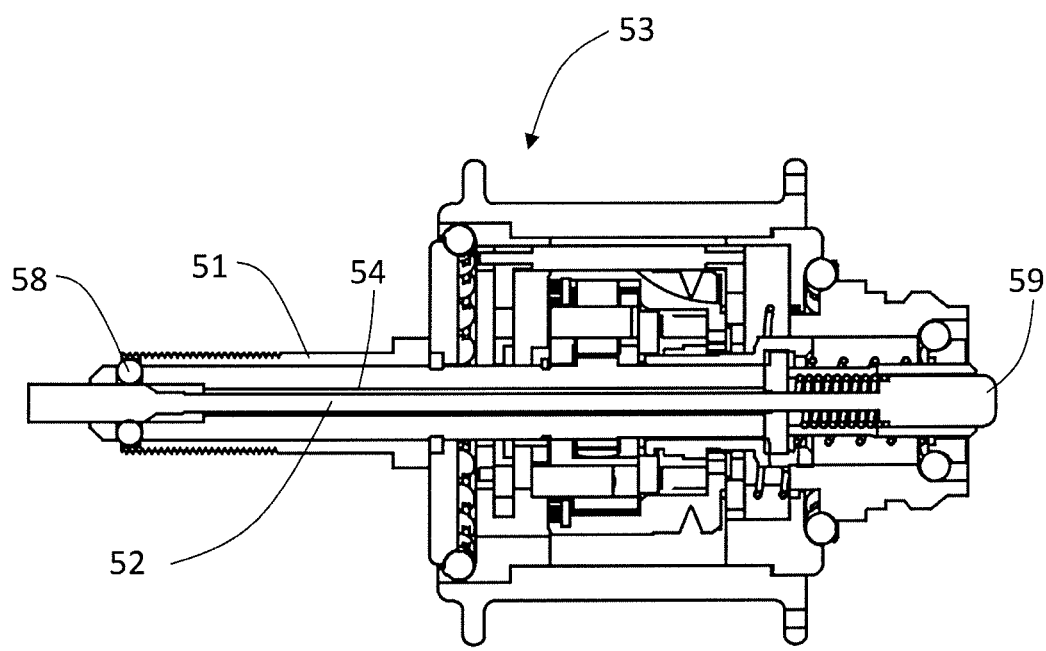
FIG. 1 is a schematic illustration of a section of a hub of a previously known geared wheelchair wheel.

In overview, embodiments herein relate to a wheelchair gearshift arrangement 10 for a, e.g. through U.S. Pat. No. 7,832,753, previously known complete geared wheelchair wheel 50 having a hub 53, as illustrated in FIG. 1, which comprises an attachment shaft or wheel axle 51 protruding to one side thereof, and where gear change is actuated by axial manipulation of an, e.g. rod shaped, axially translatable, gear change mechanism 52, which is arranged to run within the wheel axle 51 in a cylindrical bore which is concentric with the wheel axle 51.

Figure 2:
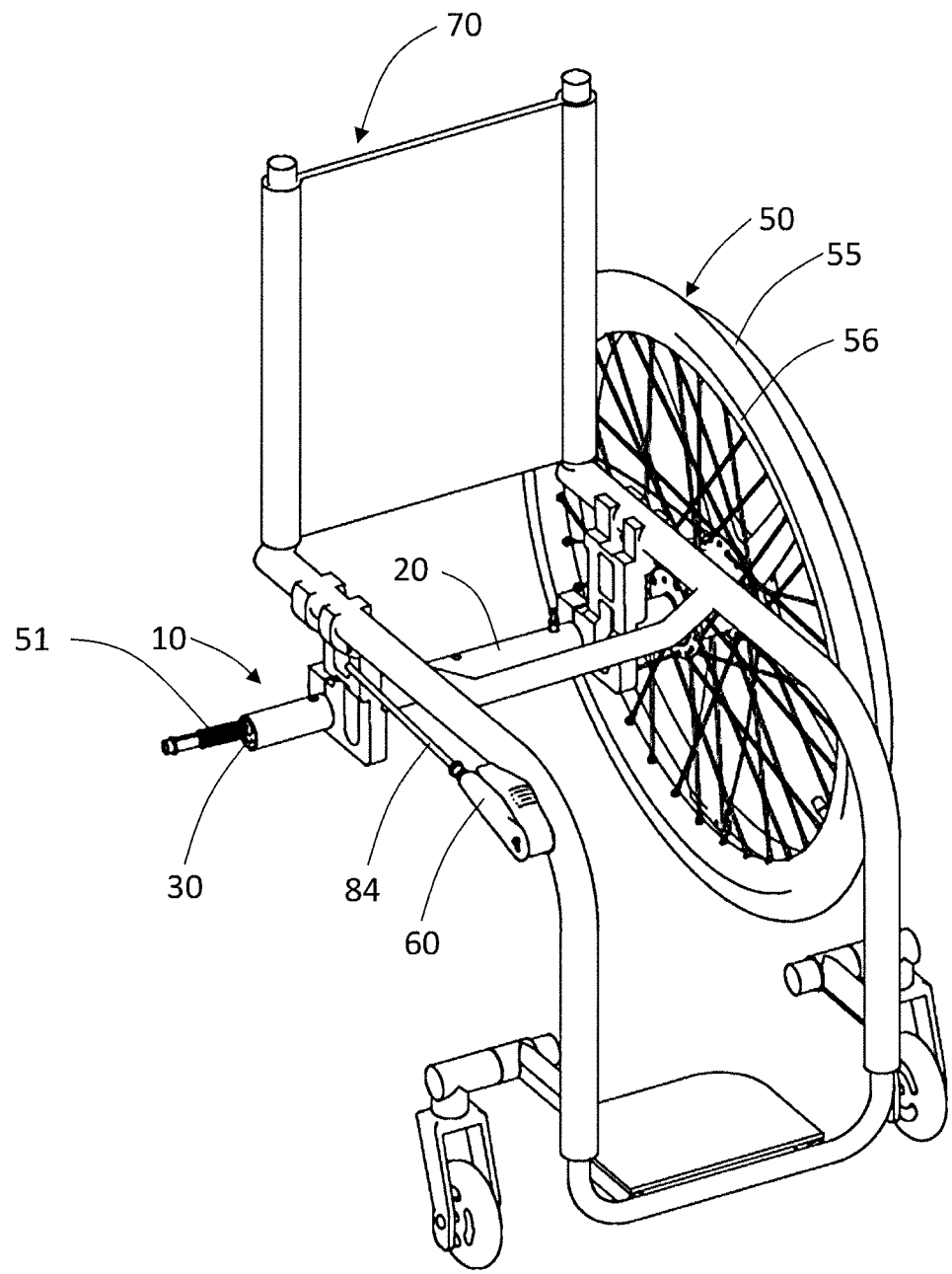
FIG. 2 is a schematic illustration of a wheelchair having a wheelchair gearshift arrangement according to embodiments hereof.

In normal everyday use the wheel axle 51 of the complete wheelchair wheel 50 will be connected to a wheelchair gearshift arrangement 10 which is firmly fixed to a frame or chassis of a wheelchair 70, as illustrated in FIG. 2.

Thus, according to embodiments hereof the wheelchair gearshift arrangement 10 comprises an axle tube 20, for affixing the wheelchair gearshift arrangement 10 to a frame or chassis of a wheelchair 70.

Figure 3:
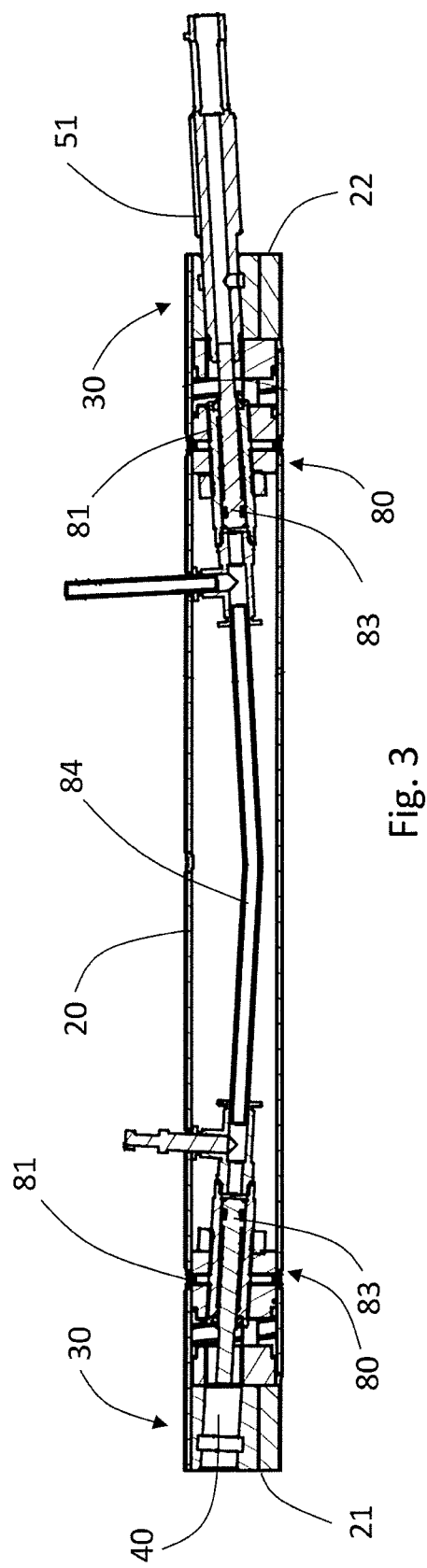
FIG. 3 is a schematic illustration of a section of a wheelchair gearshift arrangement according to embodiments hereof.

As illustrated in FIG. 3, a pair of wheel attachment adaptors 30 are inserted one into a respective end 21, 22 of the axle tube 20. The wheel attachment adaptors 30 include a respective axle sleeve 40 adapted to receive and hold a respective wheel axle 51 of a respective complete wheelchair wheel 50.

Each complete wheelchair wheel 50 has a respective wheel axle centric, axially translatable, gear change mechanism 52. The respective wheel axles 51 are held in their respective axle sleeve 40 such that one or more gear change actuators 80 arranged within the axle tube 20 are operative to selectively, upon user manipulation of an associated gear selector 60, axially translate the associated gear change mechanisms 52 of the respective complete wheelchair wheel 50. Such translation of the associated gear change mechanisms 52 will affect a change of gear ratio between a push-rim 55 and wheel-rim 56 of each respective complete wheelchair wheel 50.

The axle sleeves 40 of each respective wheel attachment adaptor 30 comprises means for preventing rotation of a wheel axle 51 held therein relative to the axle tube 20.

Figure 4:
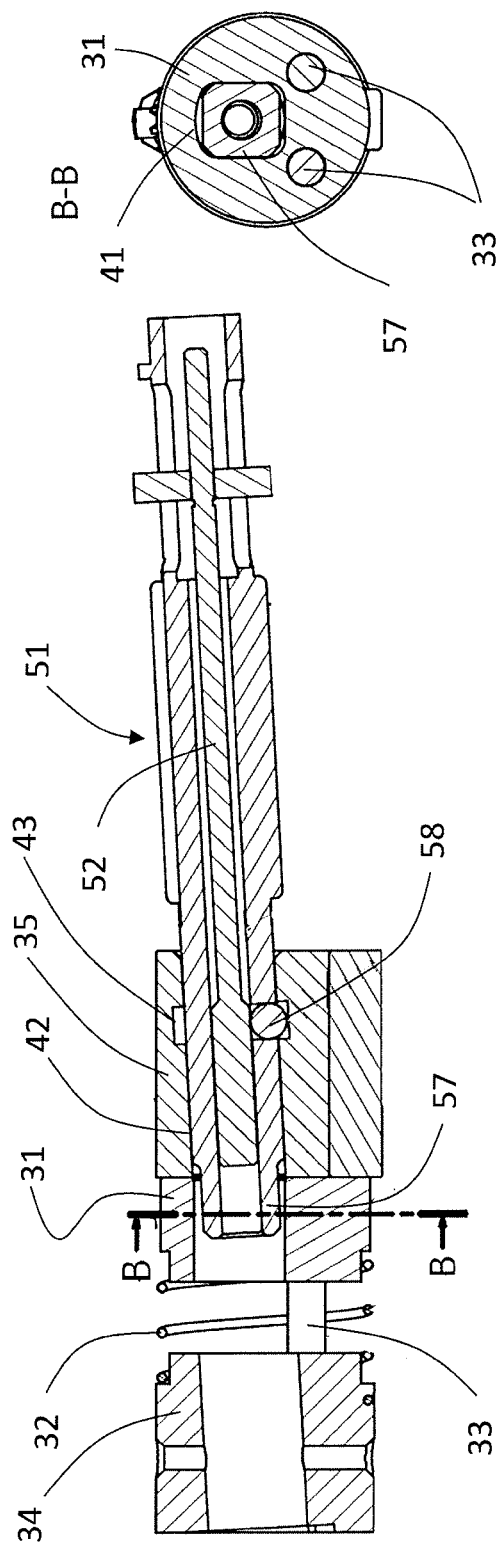
FIG. 4 is a schematic illustration of a longitudinal section of a wheel attachment adaptor having a wheel axle inserted thereto and a section B-B through the adaptor.

As illustrated in section B-B of FIG. 4, the means for preventing rotation of a wheel axle 51 held therein comprises an element 31, which is rotation inhibited with respect to the axle tube 20. The rotation inhibited element 31 has a non-circular axle sleeve section 41 adapted to receive a complementary non-circular distal section 57 of a wheel axle 51. Hereby rotation of the respective wheel axle 51 relative to the axle tube 20 will be inhibited.

In one embodiment, as illustrated in FIG. 4, the rotation inhibited element 31 is arranged to be displaced inside the axle tube 20 upon insertion of a wheel axle 51 into the axle sleeve 40. This displacement of the rotation inhibited element 31 will occur against the returning force of a returning spring 32. This displacement will be from a first wheel axle 51 rotation inhibiting position to a second position outside the distal section 57 of an inserted wheel axle 51, where the complementary non-circular distal section 57 of the wheel axle 51 is free to rotate relative to the axle tube 20. Thus, in this second position the rotation inhibited element 31 does not contact the non-circular distal section 57 of the wheel axle 51.

Hence, once the wheel axle 51 has been inserted into the wheel attachment adaptor 30 the non-circular distal section 57 of the wheel axle 51 will be free to rotate with the complete wheelchair wheel 50 until it matches, i.e. is aligned with, the non-circular axle sleeve section 41 of the rotation inhibited element 31, whereupon the rotation inhibited element 31 is arranged to be returned by the returning spring 32 to the first wheel axle 51 rotation inhibiting position, in which position rotation of the wheel axle 51 relative to the axle tube 20 will be inhibited. Thus the wheel axle 51 will automatically be locked against rotation relative to the axle tube 20 following attachment of a wheel to the wheel attachment adaptor 30.

In embodiments hereof the rotation inhibited element 31 is arranged such that it is displaceable along one or more guide elements 33. These guide elements 33 are connected to a circular axle sleeve 42 element 35 of the wheel attachment adaptors 30 which is fixed to the axle tube 20. The rotation inhibited element 31 preferably has a slightly smaller diameter than an inner diameter of the axle tube 20, such that it is easily displaceable along the one or more guide elements 33 without contacting an inner surface of the axle tube 20. When using two or more guide elements 33, these guide elements 33 may be cylindrical rod shaped elements or similar, however it is feasible to use other suitably shaped guide elements.

When using only one guide element 33, this guide element 33 should preferably have a non-circular cross-section, such that it also functions to prevent rotation between the circular axle sleeve 42 element 35 and the rotation inhibited element 31 of the wheel attachment adaptors 30.

Through the provision of a rotation inhibited element 31 being separate from the circular axle sleeve 42 element 35 of the wheel attachment adaptors 30 is enabled convenient adaptation of the wheel attachment adaptors 30 to different shape non-circular distal section 57 of the wheel axle 51 used. Adaptation may thus, if desired, simply be made through exchanging a first rotation inhibited element 31 of a first shape complementary to a first shape distal section 57 of a wheel axle 51 to a second rotation inhibited element 31 of a second shape complementary to a second shape distal section 57 of a wheel axle 51.

The wheelchair gearshift arrangement 10 may be provided with locking means for releasably locking the wheel axle 51 to an axle sleeve 40 of a wheel attachment adaptor 30 of the wheelchair gearshift arrangement 1, such that the wheel axle 51 cannot move out from the axle sleeve 40 until the locking means are released.

Thus, for inhibiting axial displacement of the wheel axle 51 relative to the axle sleeve 40 the axle sleeve 40 comprises a recess 43 formed inside the axle sleeve 40. The recess 43 is provided for receiving a quick locking catch 58 arranged at the wheel axle 51 of the complete wheelchair wheel 50. Release of the quick locking catch 58 may be effected through axial displacement of the axially translatable, gear change mechanism 52 in a direction inwards of the axle sleeve 40, i.e. towards the center of the axle tube 20.

Thus, the rod shaped, axially translatable, gear change mechanism 52 may have dual purposes, one being to serve as initiator for engagement and disengagement of the locking of the complete geared wheelchair wheel 50 to the axle sleeve 40 of the wheel attachment adaptor 30 by the locking means, e.g. the quick locking catch 58, and the other to serve as one of the gear shift's components which actively selects gear ratio between a push-rim 55 and wheel-rim 56 among the gears of the hub 53 of the complete geared wheelchair wheel 50.

Although described in the following embodiment as a combination of a quick locking catch 58 at the wheel axle 51 of the complete geared wheelchair wheel 50 and a recess 43 in the axle sleeve 40 of the wheel attachment adaptor 30, it is obvious to the person skilled in the art that the locking means may be any locking means suitable for providing a releaseable locking of the wheel axle 51 to the axle sleeve 40 of the wheel attachment adaptor 30. The locking means may, as in the case of the combination of the quick locking catch 58 and the recess 43, comprise one or more elements arranged at the wheel attachment adaptor 30 which are arranged to cooperate with one or more elements arranged at the wheel axle 51 of the complete geared wheelchair wheel 50 for effecting the locking of the complete geared wheelchair wheel 50 to the wheel attachment adaptor 30.

With a complete geared wheelchair wheel 50 attached the axle sleeve 40 of the wheel attachment adaptor 30 the axle sleeve 40 is concentric with the wheel axle 51. The axle sleeve 40 of the wheel attachment adaptor 30 has the internal recess 43, see FIG. 4, in which the quick locking catch 58, which in a locking position protrudes beyond the periphery of the wheel axle 51, can be accommodated. The recess 43 prevents the wheel axle 51 from moving out of the axle sleeve 40 of the wheel attachment adaptor 30 when the rod shaped, axially translatable, gear change mechanism 52 is in a position which locks the quick locking catch 58 in a protruding position. By this arrangement the wheel axle 51 is locked and fixed to the axle sleeve 40 of the wheel attachment adaptor 30 and cannot move in an axial direction relative thereto.

By applying a pushing force to an end of the rod shaped, axially translatable, gear change mechanism 52, which serves as a knob 59, see FIG. 1, protruding from the side of the hub 53 opposite to the side of the wheel axle 51, e.g. by pressure of a finger, a spring force can be overcome and the rod shaped, axially translatable, gear change mechanism 52 can be pushed so that it moves inwards relative to the axle sleeve 40 of the wheel attachment adaptor 30. When the rod shaped, axially translatable, gear change mechanism 52 is thus pressed in, the quick locking catch 58 will be retracted inwards radially of the wheel axle 51 and become accommodated within the periphery of the wheel axle 51. The result will be that the quick locking catch 58 no longer locks the wheel axle 51 to the axle sleeve 40 of the wheel attachment adaptor 30, which means that the complete geared wheelchair wheel 50 can be drawn out from the axle sleeve 40 of the wheel attachment adaptor 30. The complete geared wheelchair wheel 50 may thus be unlocked and entirely freed from the wheelchair 70 by pushing the rod shaped, axially translatable, gear change mechanism 52 inwards relative to the axle sleeve 40 of the wheel attachment adaptor 30.

Locking a complete geared wheelchair wheel 50 to the axle sleeve 40 of the wheel attachment adaptor 30 proceeds correspondingly in the opposite order. Keeping the rod shaped, axially translatable, gear change mechanism 52 pressed in and introducing the wheel axle 51 into the axle sleeve 40 of the wheel attachment adaptor 30 will cause the quick locking catch 58 to stay within the periphery of the wheel axle 51 during insertion. Upon release of the rod shaped, axially translatable, gear change mechanism 52 the quick locking catch 58 will, if positioned at the recess 43, move out radially so that it may enter the recess 43 and become trapped therein. Thus the wheel axle 51 is once again locked to the axle sleeve 40 of the wheel attachment adaptor 30, as described above.

Thus, as described above, the recess 43 is formed inside the axle sleeve 40 of the wheel attachment adaptor 30 for receiving the quick locking catch 58 such that the wheel axle 51 cannot move out from the axle sleeve 40 of the wheel attachment adaptor 30 unless the rod shaped, axially translatable, gear change mechanism 52 is pushed into the axle sleeve 40 of the wheel attachment adaptor 30, allowing the quick locking catch 58 to move out of the recess 43. The recess 43 may be embodied as a circular recess encircling an inner wall of the axle sleeve 40, whereby the quick locking catch 58 is allowed to enter the recess 43, and thus lock the wheel axle 51 to the axle sleeve 40 of the wheel attachment adaptor 30 irrespective of the rotation of the wheel axle 51, facilitating quick attachment of the complete geared wheelchair wheel 50.

Figure 5:
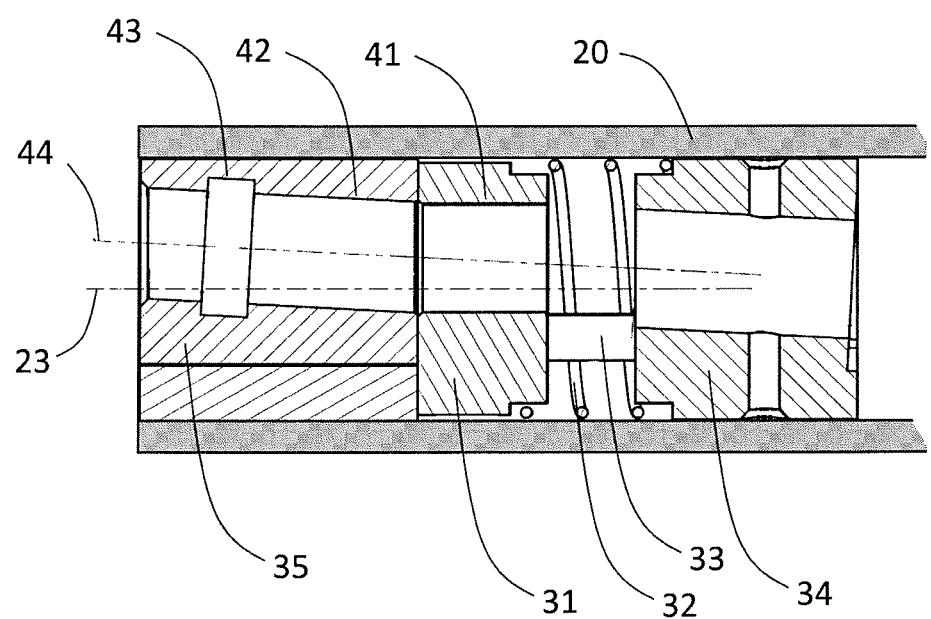
FIG. 5 is a schematic section illustration of how in some embodiments a central axis of the axle sleeve is inclined relative to a central axis of the axle tube.

In some embodiments hereof, such as illustrated in FIG. 5, a central axis 44 of each respective axle sleeve 40 is inclined relative to a central axis 23 of the axle tube 20. Hereby any complete wheelchair wheels 50 being attached to the axle sleeves 40 are automatically provided with appropriate camber and/or toe-in, toe-out angles when the axle tube 20 is attached to the chassis of a wheelchair 70.

Figure 6:
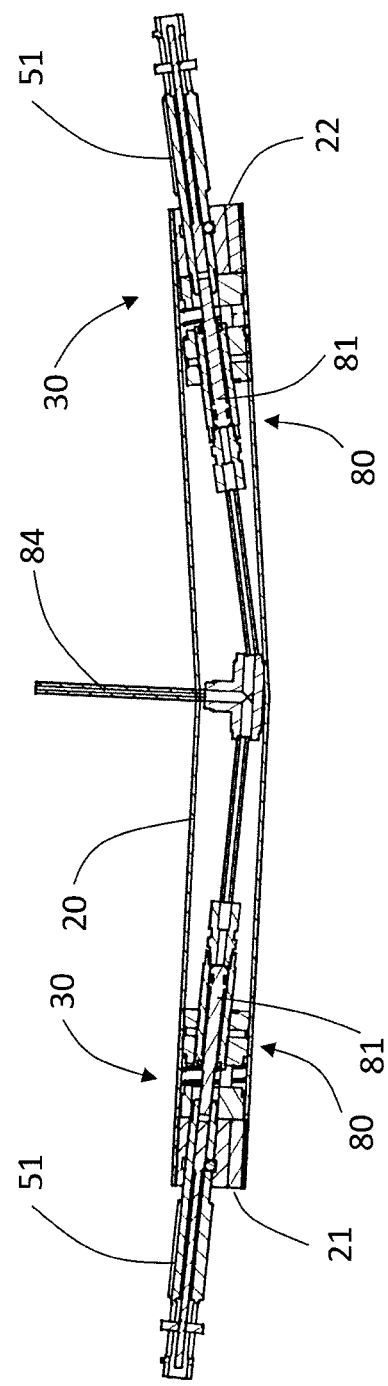
FIG. 6 is a schematic illustration of how in some embodiments the axle tube is bent such that the central axis's of the respective axle sleeves are inclined relative to each other.

In other alternative embodiments hereof, such as illustrated in FIG. 6, the axle tube 20 is bent such that the central axis's 44 of the respective axle sleeves 40 are inclined relative to each other. Hereby any complete wheelchair wheels 50 being attached to the axle sleeves 40 are automatically provided with appropriate camber and/or toe-in, toe-out angles when the axle tube 20 is attached to the chassis of a wheelchair 70. As shown in FIG. 6, in embodiments hereof FIG. 5 embodiments, as described above, may be combined with a bent axle tube 20, such that appropriate camber and/or toe-in, toe-out angles are provided by the combination of angles provided by the bent axle tube 20 and the inclined axle sleeves 40.

Figure 7:
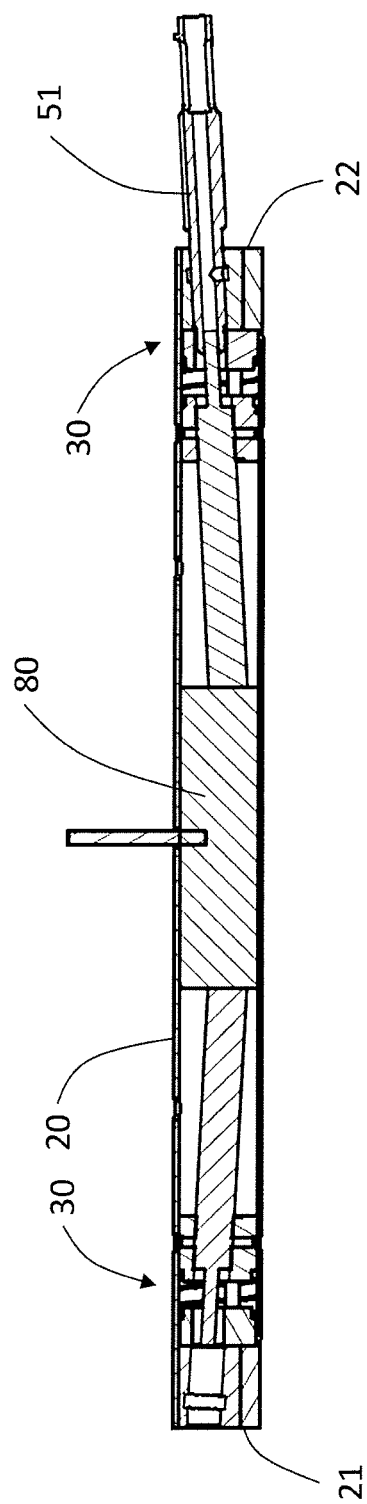
FIG. 7 is a schematic illustration of how in some embodiments one single gear change actuator is arranged within the axle tube.

In certain embodiments hereof, such as illustrated in FIG. 7, one single gear change actuator 80 is arranged within the axle tube 20. It will then need to be arranged within the axle tube 20 such that it is operative to selectively, upon user manipulation of the associated gear selector 60, simultaneously axially translate both of the associated gear change mechanisms 52 to affect the change of gear ratio.

In other embodiments hereof, such as illustrated in FIG. 3, a respective gear change actuator 80 is arranged within the axle tube 20. One gear change actuator 80 will then need to be arranged adjacent to each respective wheel attachment adaptor 30, such that they are operative to selectively, upon user manipulation of the associated gear selector 60, simultaneously axially translate both of the associated gear change mechanisms 52 to affect the change of gear ratio. Each actuator may in this embodiment be mounted to an actuator attachment axle sleeve element 34, which in this case, as illustrated in FIG. 4, may form part of the wheel attachment adaptors 30, which then will comprise a circular axle sleeve 42 element 35 and a non-circular axle sleeve section 41 element 31 and the actuator attachment axle sleeve element 34 as well as the returning spring 32 and the one or more guide elements 33.

Figure 9:
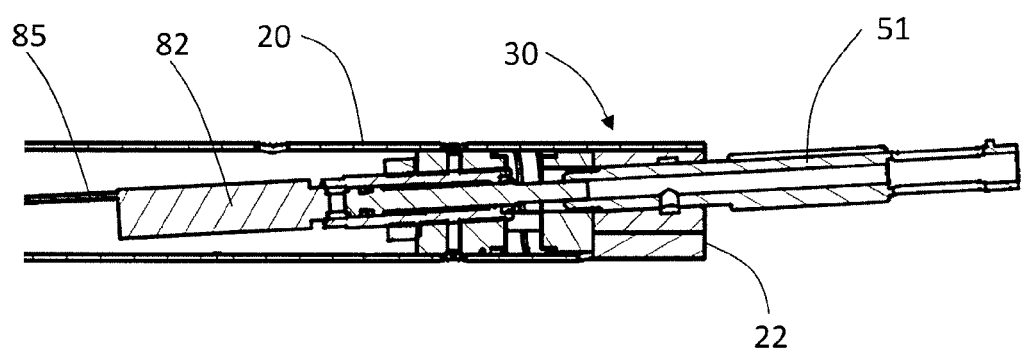
FIG. 9 is a schematic illustration of longitudinal section of a one end of a wheelchair gearshift arrangement having electrical actuators according to embodiments hereof.

It has been envisaged to use different types of actuators with the herein proposed wheelchair gearshift arrangement 10. Thus, according to certain embodiments hereof, e.g. as illustrated in FIGS. 3 and 4, the one or more gear change actuators 80 will be hydraulic actuators, e.g. such which comprises a spring 88 returned hydraulic cylinder piston arrangement 81. In other embodiments, e.g. as illustrated in FIG. 9, the one or more gear change actuators 80 comprises an electrical actuator, such as a linear electric motor, a rotary electric motor having means for converting the rotary motion to a linear motion, an electromagnetic linear actuator or similar. In yet other embodiments the one or more gear change actuators 80 comprises a pneumatic actuator (not shown), such as a cylinder and piston arrangement. It will be clear to a person skilled in the relevant art that a suitable linear actuator based on any arbitrary technology could be used for the herein proposed wheelchair gearshift arrangement 10.

Figure 8:
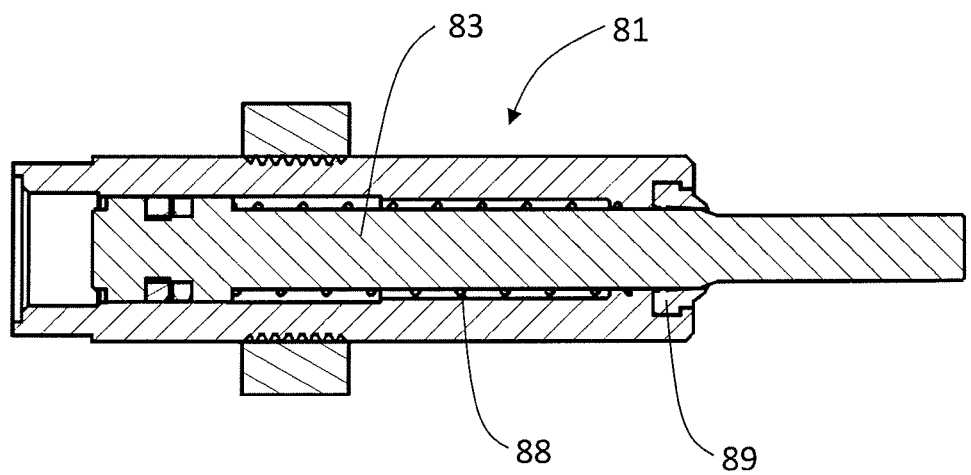
FIG. 8 is a schematic illustration of longitudinal section of an hydraulic actuator comprising a spring returned hydraulic cylinder piston arrangement.

In embodiments having hydraulic gear change actuators 80, such as in accordance with FIG. 3, the gear change actuator 80 comprises a gear shift plunger/piston 83, e.g. as illustrated in FIG. 8, which is arranged for hydraulic activation within the axle tube 20. The gear shift plunger/piston 83 is connected to the gear selector 60 by means of an hydraulic tube or hose 84. The hydraulic tube or hose 84 may be attached to the gear shift plunger/piston 83 by means of an hydraulic nipple (not shown), a sealing 89 and an hydraulic hose clamp (not shown). A bleeder nipple (not shown) may further be provided, for ventilating the hydraulic system.

Upon activation, when the complete wheelchair wheel 50 is attached to the wheel attachment adaptor 30, i.e. when a user of an associated wheelchair 70 manipulates the gear selector 60 to a gear change position, hydraulic oil will flow from the gear selector 60 through the hydraulic hose 84 and into a space behind the gear shift plunger/piston 83, which in turn pushes the rod shaped, axially translatable, gear change mechanism 52 outwards of the axle sleeve 40 towards the hub 53 of the complete geared wheelchair wheel 50 for effecting a change of gear ratio between a push-rim 55 and wheel-rim 56 of the complete wheelchair wheel 50.

The locking means, e.g. the combination of the quick locking catch 58 and the recess 43, ensures that the wheel axle 51 is not pushed out of the axle sleeve 40 of the wheel attachment adaptor 30 during gear change, through locking the wheel axle 51 to the wheel attachment adaptor 30.

When the user of the wheelchair 70 desires to return to the original gearing the user manipulates the gear selector 60 to the initial position, releasing the hydraulic activation pressure. Once the hydraulic activation pressure is released the hydraulic oil may flow back towards the gear selector 60 whereupon a return spring 88 is allowed to return the gear shift plunger/piston 83 to a retracted position, i.e. the return spring is arranged to return the hydraulic gear shift plunger/piston 83 to a retracted position upon release of hydraulic activation pressure.

Although shown, in the illustrated embodiments, as aligned with the wheel axle 51 and thus arranged to push directly on the rod shaped, axially translatable, gear change mechanism 52, it is possible to envisage alternative embodiments where the gear shift plunger/piston 83 is arranged at an angle to an extension of the rod shaped, axially translatable, gear change mechanism 52 and an intermediary member (not shown) is used for redirecting a pushing movement of the gear shift plunger/piston 83 to act axially upon the rod shaped, axially translatable, gear change mechanism 52.

For embodiments having two gear change actuators 80, one at each wheel attachment adaptor 30, synchronous gear change is ensured through splitting one hydraulic hose 84 originating at the gear selector 60 into two separate hydraulic hoses 84, e.g. as shown in FIGS. 3 and 6, each of which hose 84 connect the gear selector 60 with a respective hydraulic gear change actuator 80. Such an hydraulic split enables synchronous change of gears without need for repeated adjustment.

In embodiments having electric gear change actuators 80, e.g. as shown in FIG. 9, the electric gear change actuator 80 comprises an electrical actuator, such as a linear electric motor, a rotary electric motor having means for converting the rotary motion to a linear motion, an electromagnetic linear actuator or similar, which is arranged for electric activation within the axle tube 20. The electric gear change actuator 80 is connected to the gear selector 60 by means of electrical wiring 85. The electrical wiring 85 may be connected to the electric gear change actuator 80 by means of suitable electrical connectors (not shown).

In embodiments having pneumatic gear change actuators 80 (not shown) the setup will be similar to that of the hydraulic gear change actuator embodiments described above, with the difference that the hydraulic components will be replaced by corresponding pneumatic components.

In still other embodiments hereof the one or more gear change actuators 80 comprises one or more mechanical actuators (not shown), which are arranged to transfer gear change movement from the associated gear selector 60 via a mechanical transfer mechanism, such as a linkage or a wire arrangement (not shown).

Hence, in embodiments having mechanical gear change actuators 80 the mechanical gear change actuator 80 comprises means for transferring linear motion, which are arranged for mechanical activation within the axle tube 20. The mechanical gear change actuator 80 is connected to the gear selector 60 by means of linkage or wire arrangements.

In accordance with the present application is also envisaged a wheelchair 70 comprising a wheelchair gearshift arrangement 10 as described above.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

The invention claimed is:

1. A wheelchair gearshift arrangement comprising:
an axle tube; and
a pair of wheel attachment adaptors inserted into respective ends of the axle tube, wherein the wheel attachment adaptors each include a respective axle sleeve adapted to receive and hold a respective wheel axle of a respective complete wheelchair wheel, wherein each of the respective complete wheelchair wheels has (i) a respective wheel axle with a centric, axially translatable, gear change mechanism, (ii) a push-rim, and (iii) a wheel-rim;
one or more gear change actuators arranged within the axle tube that are operative to selectively, upon manipulation of an associated gear selector, axially translate the gear change mechanism of each of the respective complete wheelchair wheels, wherein the axial translation of the gear change mechanism of each of the respective complete wheelchair wheels affects a change of gear ratio between the push-rim and the wheel-rim of each of the respective complete wheelchair wheels.

2. A wheelchair gearshift arrangement according to claim 1, wherein the respective axle sleeve of each of the wheel attachment adaptor comprises means for preventing rotation of the respective wheel axle held therein relative to the axle tube.

3. A wheelchair gearshift arrangement according to claim 2, wherein the means for preventing rotation comprises a rotation inhibited element that is rotation inhibited with respect to the axle tube and that has a non-circular axle sleeve section adapted to receive a complementary non-circular distal section of the respective wheel axle for inhibiting rotation thereof relative to the axle tube.

4. A wheel chair gearshift arrangement according to claim 3, wherein the rotation inhibited element is arranged to, upon insertion of the respective wheel axle into the respective axle sleeve, be displaced inside the axle tube against a returning spring from a first wheel axle rotation inhibiting position to a second wheel axle rotation permitting position, wherein the second wheel axle rotation position is outside the complementary non-circular distal section of the respective wheel axle such that the complementary non-circular distal section of the respective wheel axle is free to rotate relative to the axle tube until the complementary non-circular distal section of the respective wheel axle matches the non-circular axle sleeve section, wherein when the complementary non-circular distal section of the respective wheel axle matches the non-circular axle sleeve section the rotation inhibited element is arranged to be returned to the first wheel axle rotation inhibiting position by the returning spring for inhibiting rotation of the wheel axle relative to the axle tube.

5. A wheelchair gearshift arrangement according to claim 4, wherein the rotation inhibited element is displaceable along one or more guide elements which are connected to a circular axle sleeve element of the wheel attachment adaptors which is fixed to the axle tube.

6. A wheelchair gearshift arrangement according to claim 1, wherein the respective axle sleeve comprises a recess formed inside the respective axle sleeve for receiving a quick locking catch arranged at the respective wheel axle of the respective complete wheelchair wheel for inhibiting axial displacement of the respective wheel axle relative to the respective axle sleeve, and where release of the quick locking catch is arranged to be effected through axial displacement of the centric, axially translatable, gear change mechanism in a direction inwards of the respective axle sleeve.

7. A wheelchair gearshift arrangement according to claim 1, wherein a central axis of each of the respective axle sleeves is inclined relative to a central axis of the axle tube such that each of the respective complete wheelchair wheels attached to the respective axle sleeve are automatically provided with one or more of: appropriate camber and toe-in, toe-out angles when the axle tube is attached to a chassis of a wheelchair.

8. A wheelchair gearshift arrangement according to claim 1, wherein the axle tube is bent such that central axes of the respective axle sleeves are inclined relative to each other such that each of the respective complete wheelchair wheels attached to the respective axle sleeve are automatically provided with one or more of: appropriate camber and toe-in, toe-out angles when the axle tube is attached to a chassis of a wheelchair.

9. A wheelchair gearshift arrangement according to claim 1, wherein one of the one or more gear change actuators is arranged within the axle tube such that the one of the one or more gear change actuators is operative to selectively, upon manipulation of the associated gear selector, simultaneously axially translate the gear change mechanism of each of the respective complete wheelchair wheels to affect the change of gear ratio.

10. A wheelchair gearshift arrangement according to claim 1, wherein respective ones of the one or more gear change actuators are arranged within the axle tube adjacent corresponding ones of the wheel attachment adaptors such that the respective ones of the one or more gear change actuators are operative to selectively, upon manipulation of the associated gear selector, simultaneously axially translate the gear change mechanism of each of the respective complete wheelchair wheels to affect the change of gear ratio.

11. A wheelchair gearshift arrangement according to claim 1, wherein the one or more gear change actuators comprises a spring returned hydraulic cylinder piston arrangement.

12. A wheelchair gearshift arrangement according to claim 1, wherein the one or more gear change actuators comprises an electrical actuator.

13. A wheelchair gearshift arrangement according to claim 1, wherein the one or more gear change actuators comprises a pneumatic actuator.

14. A wheelchair comprising a wheelchair gearshift arrangement according to claim 1.

15. A wheelchair gearshift arrangement according to claim 1, wherein the one or more gear change actuators comprises one or more mechanical actuators that are arranged to transfer gear change movement from the associated gear selector via a mechanical transfer mechanism.

16. A wheelchair gearshift arrangement according to claim 15, wherein the mechanical transfer mechanism comprises a linkage.

17. A wheelchair gearshift arrangement according to claim 15, wherein the mechanical transfer mechanism comprises a wire arrangement.

* * * * *